United States Patent
Katou et al.

[11] Patent Number: 6,158,721
[45] Date of Patent: Dec. 12, 2000

[54] APPARATUS AND METHOD FOR ADDING CARBON DIOXIDE GAS TO ULTRA PURE WATER

[75] Inventors: Hitoshi Katou, Funabashi; Kazunari Sakai, Yotsukaido; Toshio Kambe; Kazumi Oi, both of Ichihara, all of Japan

[73] Assignee: Dainippon Ink and Chemicals, Inc., Tokyo, Japan

[21] Appl. No.: 09/195,993

[22] Filed: Nov. 20, 1998

[51] Int. Cl.$^7$ .................................................. B01F 3/04
[52] U.S. Cl. .......................... 261/26; 261/64.1; 261/100; 261/107; 261/DIG. 7
[58] Field of Search ............................... 261/75, 76, 100, 261/DIG. 7, 107, 64.1, 26; 96/8, 10

[56] References Cited

U.S. PATENT DOCUMENTS

| | | | |
|---|---|---|---|
| 4,173,178 | 11/1979 | Wieland | 261/76 |
| 4,664,681 | 5/1987 | Anazawa et al. | |
| 4,673,443 | 6/1987 | Fetty | 261/DIG. 7 |
| 5,192,320 | 3/1993 | Anazawa et al. | |

FOREIGN PATENT DOCUMENTS

| | | |
|---|---|---|
| 57-86623 | 5/1982 | Japan . |
| 2-38250 | 8/1990 | Japan . |
| 2-279158 | 11/1990 | Japan ............... 261/DIG. 7 |
| 2-54377 | 11/1990 | Japan . |
| 5-21841 | 3/1993 | Japan . |
| 7-60082 | 3/1995 | Japan . |
| 2725311 | 12/1997 | Japan . |

OTHER PUBLICATIONS

WPI Abstract and full text of French 2656546.
WPI Abstract of Japan 10324502.

*Primary Examiner*—Duane Smith
*Assistant Examiner*—Robert A. Hopkins
*Attorney, Agent, or Firm*—Armstrong, Westerman, Hattori, McLeland & Naughton

[57] ABSTRACT

A small flow of a water with a high carbon dioxide content (normally a carbon-dioxide-saturated water) is produced using hollow-fiber membranes, and is uniformly mixed with a large flow of untreated water with constant proportions. Since the hollow-fiber membrane module has a reserve capacity for adding carbon dioxide to the water, the resistivity of the mixed water is maintained at a constant level by maintaining constant proportions of the small and large flows, even if the total flow rate fluctuates due to fluctuations in the rate of water used in a subsequent process. Accordingly, no automated control device is particularly necessary in order to maintain the resistivity at a constant level. Therefore, a compact and simple apparatus can be produced which can operate at a low cost.

17 Claims, 2 Drawing Sheets

APPARATUS AND METHOD FOR ADDING CARBON DIOXIDE GAS TO ULTRA PURE WATER

BACKGROUND OF THE INVENTION

1. Field of the Invention

The present invention relates to apparatuses and methods for controlling resistivity of ultra pure water to be used as cleaning water in the production of semiconductor or liquid crystal devices.

This application is based on patent application No. Hei 9-130966 filed in Japan, the content of which is incorporated herein by reference.

2. Background Art

It has been widely known that when a photomask substrate is cleaned using ultra pure water (resistivity $\geqq 18$ M$\Omega \cdot$cm) in the process of producing semiconductor or liquid crystal devices, due to the high resistivity of ultra pure water, static electricity is generated, which causes dielectric breakdown or adsorption of particulates, exerting marked undesirable effects on the production rate of the substrate.

Accordingly, in order to avert such undesirable effects a method has been generally known in which the resistivity of ultra pure water is reduced by passing the ultra pure water through magnesium meshes.

In addition, methods or apparatuses in which a module of hydrophobic porous hollow-fiber membranes is used has been proposed such as "Apparatus for Dissolving Carbon Dioxide Gas into Drinking Water" (Japanese Utility Model Application, First Publication (Kokai), No. 57-86623), "Apparatus for Controlling Resistivity of Ultra Pure Water" (Japanese Patent Application, Second Publication (Kokoku), No. Hei 5-21841), and "Method and Apparatus for Controlling Resistivity of Ultra Pure Water" (Japanese Patent Application, First Publication (Kokai), Hei 7-60082).

However, since hydrophobic porous membranes such as those made of polypropylene are used in a module according to the methods of Japanese Utility Model Application, First Publication (Kokai), No. 57-86623 and Japanese Patent Application, Second Publication (Kokoku), No. Hei 5-21841, carbon dioxide gas which has penetrated through the membranes exists as bubbles in water, not only making it difficult to control the resistivity at a constant and uniform value, but also causing problems in that water vapor condenses on the surface of the pore portions of the porous layer, and ultra pure water leaks.

Furthermore, since the flow rate of at least one of the ultra pure water to be treated and the carbon dioxide gas is controlled in the method of Japanese Patent Application, Second Publication (Kokoku), No. Hei 5-21841, the method requires an apparatus having a complicated controlling mechanism, and when the required flow rate of ultra pure water varies, and the resistivity is controlled to a predetermined value, there have been problems in that the apparatus cannot quickly respond to the variations in the required flow rate while maintaining the constant resistivity value.

Moreover, in order to solve the above problems, a three-layer membrane structure is employed in which both surfaces of a homogeneous membrane are overlaid with porous layers, and dissolved oxygen is degassed before carbon dioxide gas is supplied according to Japanese Patent Application, First Publication (Kokai), Hei 7-60082, which incurs other problems in that the apparatus and method for controlling the resistivity are complicated.

SUMMARY OF THE INVENTION

The object of the present invention is to solve all the above problems and to provide an apparatus for controlling the resistivity of ultra pure water, which is simple and compact without necessitating a controlling mechanism, and a method for controlling the resistivity of ultra pure water using such a simple and compact apparatus.

The subject matter of the present invention is as follows.

(1) An apparatus for adding carbon dioxide gas to ultra pure water comprising:

a housing to house a gas permeable membrane, the gas permeable membrane dividing the interior of the housing into an ultra pure water path and a carbon dioxide gas path, the housing having an opening for injecting carbon dioxide gas through which the carbon dioxide gas path communicates with the exterior of the housing, an inlet for untreated ultra pure water which communicates with the ultra pure water path, a distributing portion provided between the ultra pure water path and the inlet for untreated ultra pure water, an outlet for resistivity-controlled ultra pure water which communicates with the ultra pure water path, a combining portion which is provided between the ultra pure water path and the outlet for resistivity-controlled ultra pure water, and a bypass line through which the distributing portion communicates with the combining portion, wherein untreated ultra pure water introduced from the inlet for untreated ultra pure water is divided into a flow for the ultra pure water path and a flow for the bypass line at constant flow rate proportions, and the gas permeable membrane is capable of supplying carbon dioxide gas to the untreated ultra pure water which passes through the ultra pure water path up to the saturation concentration or up to an approximately constant concentration near the saturation concentration.

(2) An apparatus for adding carbon dioxide gas to ultra pure water, wherein the resistivity of the ultra pure water is controlled to have a desired value by bringing the carbon dioxide gas into contact with the ultra pure water via a gas permeable membrane so as to supply the carbon dioxide gas to the ultra pure water, the apparatus comprising:

a means for producing ultra pure water to which the carbon dioxide gas is added, the means comprising a membrane module having a gas permeable membrane, the membrane module being capable of supplying the carbon dioxide gas to the ultra pure water up to the saturation concentration or up to an approximately constant concentration near the saturation concentration at any flow rate in an expected fluctuation range, whereby the ultra pure water to which the carbon dioxide gas has been added has a constant resistivity at any flow rate of the ultra pure water supplied, and a means for combining the ultra pure water to which the carbon dioxide gas has been added and untreated ultra pure water, to which carbon dioxide gas has not been added, and for uniformly mixing them, whereby the ultra pure water to which the carbon dioxide gas has been added is diluted with the untreated ultra pure water so as to produce, after mixing, resistivity-controlled ultra pure water, which has the predetermined resistivity.

(3) An apparatus according to the above invention (2) comprising:

a hollow-fiber membrane as the gas permeable membrane, a hollow-fiber membrane for producing, at a relatively small flow rate, ultra pure water to which carbon dioxide gas is added, a bypass pipe line for running untreated ultra pure water, a distributing device for dividing the untreated ultra pure water into a flow for the hollow-fiber membrane module and a flow for the bypass pipe line with constant proportions of the flow rates, a combining-mixing device for combining the ultra pure water to which carbon dioxide gas has been added and the untreated ultra pure water which has passed the bypass pipe line, and for uniformly mixing them, and a pressure regulating valve for maintaining a constant pressure of the carbon dioxide gas which is supplied to the hollow-fiber membrane module.

(4) An apparatus according to the above invention (3), wherein the bypass pipe line is provided inside the hollow-fiber membrane module.

(5) An apparatus according to the above invention (3) or (4), wherein the hollow-fiber membrane module is of an internal water-flow type comprising a housing and a bundle of a plurality of hollow fiber membranes housed in the housing, in which carbon dioxide gas is injected into a space between the exterior of the hollow-fiber membrane and the housing, and in which the ultra pure water flows inside the hollow fiber membranes.

(6) An apparatus according to the above invention (3) or (4), wherein the hollow-fiber membrane module is of an external water-flow type comprising a housing and a bundle of a plurality of hollow fiber membranes housed in the housing, in which carbon dioxide gas is injected inside the hollow fiber membranes, and in which the ultra pure water flows in a space between the exterior of the hollow-fiber membrane and the housing.

(7) An apparatus according to the above invention (5), wherein the bypass pipe line is provided inside the hollow-fiber membrane module, the bypass pipe line, which is a tube which does not allow carbon dioxide gas to penetrate its wall, and the plurality of hollow-fiber membranes are bundled together and housed in the housing.

(8) An apparatus according to any one of the above inventions (3) to (7), wherein the hollow fiber membrane is a hydrophobic gas permeable membrane, having a permeation flux of carbon dioxide gas of $100 \times 10^{-5}$ cm$^3$/cm$^2$·sec·cmHg or less, and a gas separation factor higher than 1, the gas separation factor being calculated by dividing the permeation flux of oxygen by the permeation flux of nitrogen.

(9) An apparatus according to the above invention (8), wherein the hollow-fiber membrane comprises poly-4-methylpentene-1, and has an inner diameter of 20 to 350 $\mu$m and an outer diameter of 50 to 1000 $\mu$m.

(10) An apparatus according to the above invention (2) or (3), further comprising a static mixer for uniformly mixing the ultra pure water to which the carbon dioxide gas has been added and the untreated ultra pure water, the static mixer being provided downstream of the means for combining the ultra pure water to which the carbon dioxide gas has been added and the untreated ultra pure water.

(11) An apparatus according to the above invention (3), further comprising a device for blocking the carbon dioxide gas when abnormality occurs, the device comprising:

a resistivity sensor for monitoring the conductivity of the resistivity-controlled ultra pure water produced, a resistivity-meter which operates in response to the resistivity sensor, and a solenoid valve which can block the supply of the carbon dioxide gas in response to a signal from the resistivity sensor.

(12) A process for adding carbon dioxide gas to ultra pure water comprising the steps of:

dividing untreated ultra pure water into two flows with constant proportions, producing carbon-dioxide-added ultra pure water by adding carbon dioxide gas to one of the flows of the untreated ultra pure water via a gas permeable membrane up to the saturation concentration or up to an approximately constant concentration near the saturation concentration, and combining the carbon-dioxide-added ultra pure water and the other flow of untreated ultra pure water.

(13) A process for adding carbon dioxide gas to ultra pure water to produce a resistivity-controlled ultra pure water at a rate corresponding to a fluctuating rate of ultra pure water used in a subsequent process, the process for adding carbon dioxide gas to ultra pure water comprising the steps of:

dividing untreated ultra pure water, which is supplied at a rate corresponding to a rate of resistivity-controlled ultra pure water used in the subsequent process, into two flows, one of which is larger than the other, with constant proportions, by a distributing device, supplying the smaller flow to a hollow-fiber membrane module, in which the smaller flow and a flow of carbon dioxide gas are separated by a hollow-fiber membrane, so as to produce a carbon-dioxide-added ultra pure water, in which ultra pure water contains carbon dioxide at the saturation concentration or at an approximately constant concentration near the saturation concentration at any flow rate in an expected fluctuation range, combining the carbon-dioxide-added ultra pure water with the larger flow of the untreated ultra pure water, and uniformly mixing the combined water to produce ultra pure water which has a predetermined controlled resistivity.

(14) A process for adding carbon dioxide gas to ultra pure water according to the above invention (13), wherein the larger flow of untreated ultra pure water is made to flow in a bypass pipe line which is provided inside the hollow-fiber membrane module.

(15) A process for adding carbon dioxide gas to ultra pure water according to the above invention (13) or (14), wherein the proportion of the smaller flow to the larger flow is less than 1/50.

(16) A process for adding carbon dioxide gas to ultra pure water according to any one of the above inventions (13), (14), and (15), wherein the carbon-dioxide-added ultra pure water is ultra pure water saturated with carbon dioxide.

(17) A process for adding carbon dioxide gas to ultra pure water according to the above invention (16), wherein the pressure of the carbon dioxide gas which is in contact with the hollow-fiber membrane is maintained at a constant level using a pressure regulating valve so as to maintain the concentration of the carbon-dioxide-added ultra pure water at the saturation concentration or at an approximately constant concentration near the saturation concentration, and wherein the flow of carbon dioxide gas is supplied at rates varied according to fluctuations in the smaller flow of the untreated ultra pure water.

According to the present invention, untreated ultra pure water, which is supplied at a rate corresponding to a rate of resistivity-controlled ultra pure water used in a subsequent process, is divided into two flows, one of which is larger than the other, with constant proportions by a distributing device. The smaller flow is supplied to the hollow-fiber membrane module in which water containing carbon dioxide is produced. The water containing carbon dioxide is combined with the larger flow of the untreated ultra pure water, and the combined water is uniformly mixed. Accordingly, easy control of the resistivity is made possible.

When the ultra pure water treated by the present invention is used for a wet-process cleaner connected downstream to the apparatus of the present invention, ultra pure water having a desired resistivity can be easily and constantly supplied to the cleaner without using any control device, even if the rate of ultra pure water used suddenly varies.

DESCRIPTION OF THE PREFERRED EMBODIMENTS

Typical embodiments and the best mode of the present invention will be concretely described in the Examples later. However, these embodiments are summarized below.

Figure 1:
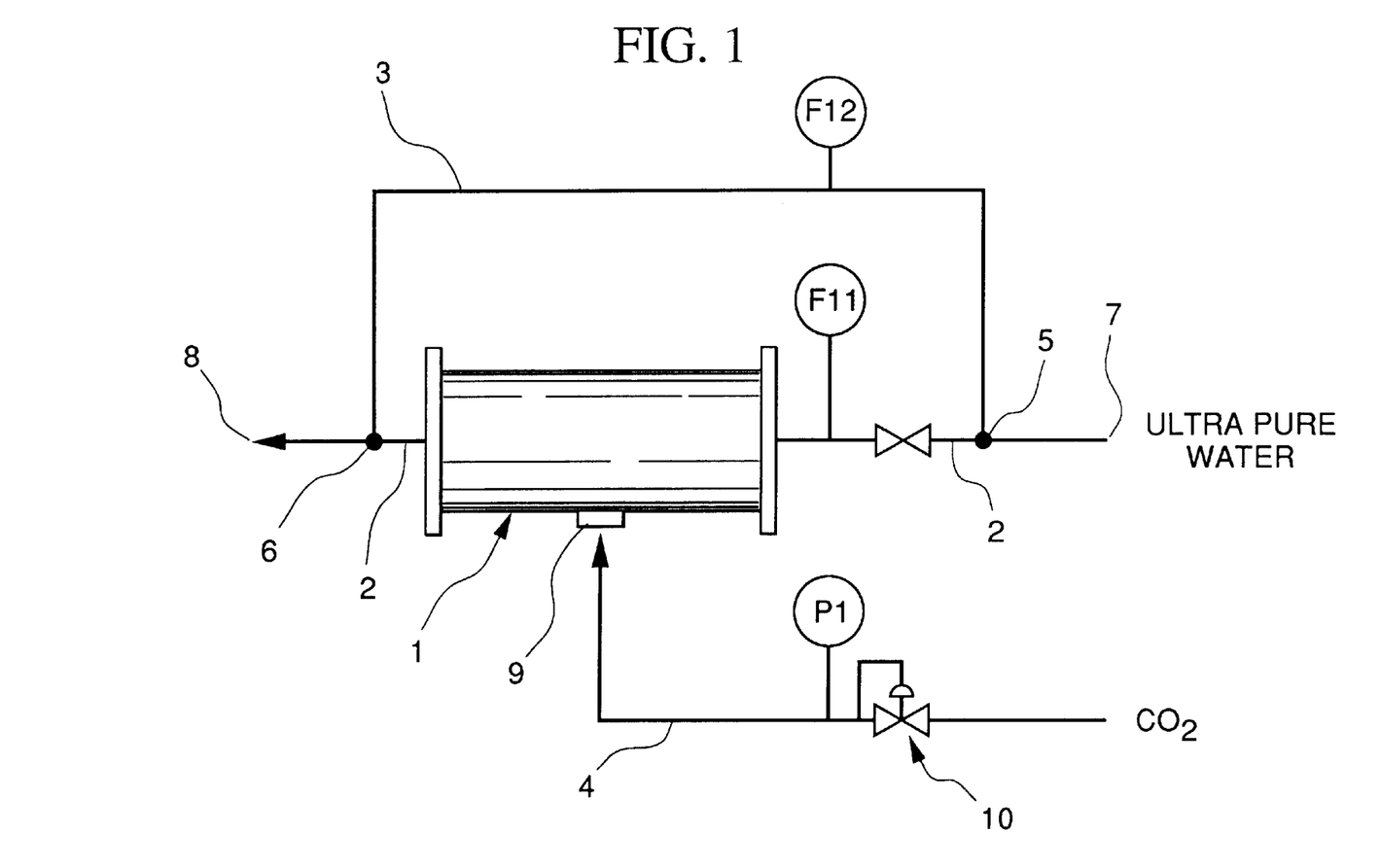
FIG. 1 is a schematic view showing an example of an apparatus according to Example 1 of the present invention for adding carbon dioxide gas to ultra pure water for the purpose of controlling the resistivity.

FIG. 1 is an example of an apparatus suitable for the present invention.

The present invention is an apparatus for adding carbon dioxide gas to ultra pure water, which is simple and compact without necessitating a complex controlling mechanism, and a method for adding carbon dioxide gas to ultra pure water using such a simple and compact apparatus. Specifically, with this apparatus and by this method, the resistivity of ultra pure water is controlled by dividing the untreated ultra pure water, the resistivity of which is to be controlled, into two flows, one of which has a larger flow rate than the other, adding carbon dioxide gas to the smaller flow to produce ultra pure water containing carbon dioxide, combining the ultra pure water containing carbon dioxide with the untreated ultra pure water having the larger flow rate, and uniformly mixing them so as to dilute the ultra pure water containing carbon dioxide.

In order to enhance the efficiency of adding carbon dioxide gas to the untreated ultra pure water, a hollow-fiber membrane module may be provided in the apparatus, so that carbon dioxide gas can be supplied and added to the ultra pure water.

As a membrane for the hollow-fiber membrane module, any gas permeable membrane through which carbon dioxide gas can sufficiently penetrate is acceptable. However, when the present invention is applied to ultra pure water to be used in a cleaning process in the production of semiconductor or liquid crystal devices, high cleanness of the water is required since the cleanness of the water greatly affects the production rate of the devices. Therefore, the degree to which contamination of the ultra pure water is reduced is important; contaminants of the ultra pure water include not only particulates released from the membrane but also organic substances, in other words, the total organic carbon (TOC), released from the membrane material.

Accordingly, in order to reduce the release of contaminants, it is necessary to properly select a membrane material, which is a possible origin of the contaminants.

Thus, concretely speaking, a membrane comprising a silicone rubber polymer, polydimethylsiloxane, or a silicone polymer such as a copolymer of silicone and polycarbonate cannot be used in production of semiconductor or liquid crystal devices since contaminants may be released into the ultra pure water.

In addition, although a membrane having contiguous pores in its inner and outer layers (which is called a "microporous membrane") as a result of its manufacturing process, such as fluorocarbon polymers such as poly (vinylidene fluoride) and poly(tetrafluoroethylene), and engineering polymers such as poly(ether ether ketone), poly(ether ketone), poly(ether sulfone), and polysulfone, do not cause the problem of the release of contaminants, such a membrane has a problem in that water vapor condenses on the surface of the pores, and the ultra pure water often leaks. The engineering polymers are also expensive.

A membrane material desirable in view of prevention of release of contaminants and hydrophobicity is a polymer of the polyolefins, such as polyethylene and polypropylene.

However, since a membrane comprising such a material has a microporous layer similar to that in the above engineering polymer, such a membrane must be made into a composite, such as one disclosed in Japanese Patent Application, First Publication (Kokai), Hei 7-60082, and complicated treatments are necessary to prevent water vapor from condensing on the surface of the pores in the porous layer.

In contrast, poly-4-methylpentene-1, in which propylene is dimerized, has such a high hydrophobicity that it has a surface tension almost comparable to poly (tetrafluoroethylene), although poly-4-methylpentene-1 is a polyolefin. In addition, a hollow-fiber membrane made from poly-4-methylpentene-1 by a special dry-type melt-spinning method provides a membrane structure which resembles a non-porous layer which has almost no contiguous pores. (See U.S. Pat. No. 4,664,681.) Accordingly, such a hollow-fiber membrane is the gas permeable membrane most suitable for the present invention.

Where the permeation flux of carbon dioxide gas is too large, the performance of the gas permeable membrane is similar to that of a membrane having micropores. In this case, since leakage of gas is marked, it becomes difficult to maintain the supply pressure of carbon dioxide gas at a constant value, and the gas is wasted.

In this regard, if the permeation flux of carbon dioxide gas is lower than $500 \times 10^{-5}$ $cm^3/cm^2 \cdot sec \cdot cmHg$, the above problems can be solved and carbon dioxide gas can be efficiently injected into ultra pure water. In order to control a minute level of the pressure of carbon dioxide gas which is to penetrate through the membrane, a carbon dioxide gas permeability lower than $100 \times 10^{-5}$ $cm^3/cm^2 \cdot sec \cdot cmHg$ is most suitable for the purpose of the present invention. However, a too small permeation flux of carbon dioxide gas is undesirable since it necessitates a membrane module having a large membrane area.

When the present invention is intended for injection of gas under pressure, a gas separation factor, expressed by (permeation flux of oxygen)/(the permeation flux of nitrogen), with which a uniform permeation of gas through a membrane is achieved is sufficient. Therefore, the membrane does not have to be perfectly non-porous. Even if pores can be observed on the outer surface of the hollow-fiber membrane, if there are almost no contiguous pores connecting the outer and inner surface, gas does not spurt as bubbles from the hollow-fiber membrane into ultra pure water. In this regard, the gas separation factor is not decisive as long as it is larger than 1.

The material for the housing in which the hollow-fiber membrane is provided may be anything as long as it does not release any contaminants into the ultra pure water.

Examples of the material for the housing are polyolefins such as polyethylene, polypropylene, and poly-4-methylpentene-1, a fluorocarbon resin such as poly (vinylidene fluoride) and poly(tetrafluoroethylene), engineering plastics such as poly(ether ether ketone), poly(ether ketone), poly(ether sulfone), and polysulfone, and clean vinyl chloride resins, which is used as a piping material for ultra pure water because of its low release of contaminants.

A hollow-fiber membrane module, which may be of an internal water-flow type or an external water-flow type, can be constructed by providing a bundle of several hollow-fiber membranes in a housing. In a module of the internal water-flow type, carbon dioxide gas is supplied to the space between the outside of the hollow-fiber membranes and the housing, and ultra pure water runs inside the hollow-fiber membranes. In a module of the external water-flow type, ultra pure water runs outside the hollow-fiber membranes, and carbon dioxide gas runs inside hollow-fiber membranes as disclosed in Japanese Patent Application, Second Publication (Kokoku), No. Hei 5-21841.

When a module of an external water-flow type is used, in order to prevent channeling of water due to nonuniform charging of a housing with hollow-fiber membranes, hollow-fiber membranes may be effectively used in which the material itself forms a sheet or in which the material is formed into threads (for example, a sheet in which hollow-fiber membranes are aligned parallel to each other, in a sparse distribution, while they are tied crosswise), the sheet being incorporated into the housing in the form of a fold, a scroll, or a bundle. Furthermore, hollow-fiber membranes may be arranged in a suitable shape, for example, in a three-dimensional shape such as a shape in which hollow-fiber membranes are wound crosswise around a cylindrical core (See U.S. Pat. No. 5,192,320).

The object of the present invention, reducing the resistivity of ultra pure water by adding carbon dioxide gas to the ultra pure water, does not limit the apparatus of the present invention to either the internal water-flow type or external water-flow type. However, if the apparatus has to cope with large changes in the flow rate of water produced, to which carbon dioxide gas is added, an internal water-flow type hollow-fiber membrane module is preferable since carbon dioxide gas must be efficiently added to the ultra pure water evenly and uniformly, and the speed of response and accuracy of the predetermined resistivity value, the reproducibility, the stability, and the like taken into consideration.

The distributing device for dividing the untreated ultra pure water into the flow to go into the hollow-fiber membrane module and the flow to go into the bypass pipe line is not specifically prescribed as long as the device can divide the untreated ultra pure water into two flows while maintaining constant proportions of the rates of the two flows even when the total flow rate of the two flows to be divided fluctuates. A tee joint for piping or a branch valve may be conveniently used. However, a distributing device may be employed in which the proportions of the flows divided are additionally controlled by a flowmeter having a precision valve or by an orifice which allows water to flow at a prescribed rate.

However, the material for the distributing device must be selected with due consideration to the release of contaminants into ultra pure water. A fluorocarbon polymer, a clean vinyl chloride, a austenitic stainless steel for ultra pure water, an inorganic glass, or the like may be preferably used as the material.

The combining device for combining the water produced by the hollow-fiber membrane module, to which carbon dioxide gas is added at a high concentration, and the untreated ultra pure water which has passed the bypass pipe line is not specifically prescribed, as long as it has flow inlets to introduce the two flows to be combined. A tee joint for piping may be conveniently employed.

Downstream of the combining device, a static mixer may be preferably provided in order to uniformly mix the two combined flows. However, uniformly-mixed diluted ultra pure water may also be obtained by providing a pipe line having an appropriate length. Materials for the combining device and the static mixer must also be selected in consideration of the release of contaminants into ultra pure water. A fluorocarbon polymer, a clean vinyl chloride, a austenitic stainless steel for ultra pure water, an inorganic glass, or the like may be preferably used as the material.

By sending the carbon dioxide gas at a constant pressure using a pressure regulating valve, the carbon dioxide gas can be supplied at a varying rate corresponding to the fluctuation of the flow rate of the ultra pure water in the membrane module, and thus a constant concentration of carbon dioxide in the ultra pure water can be maintained.

The structure, material, or type of the pressure regulating valve to regulate carbon dioxide gas pressure is not specifically prescribed as long as the gas is filtered beforehand in the supply source side (upstream) so as to keep contamination in the gas from attaching to the hollow-fiber membranes. A pressure regulating valve generally used in the production of semiconductor or liquid crystal devices may be employed.

In contrast to the background art, in which precise automatic control of the flow rate and pressure of carbon dioxide gas was conducted, the concentration of carbon dioxide according to the present invention need only be maintained at the saturation concentration or at an approximately constant concentration near the saturation concentration. Therefore, a highly automated control of a valve is not necessary in the present invention.

Here, "at the saturation concentration or at an approximately constant concentration near the saturation concentration" means a concentration equal to or higher than 90% of the concentration at equilibrium, which is proportional to the pressure of carbon dioxide gas supplied, as determined in accordance with Henry's law.

The pressure of the carbon dioxide gas suitable for the present invention is 0.15 to 1.5 $kgf/cm^2 \cdot G$.

For example, a valve for controlling the pressure (a regulator), such as a pressure regulating valve, a bellows pressure valve, a pressure regulator, and a back pressure valve may be used.

Any pipe for running ultra pure water which has a pipe wall through which carbon dioxide gas does not penetrate may be used as the bypass pipe line. The shape of the bypass pipe line does not matter as long as the bypass pipe line can maintain the predetermined proportions of the flow rates of the two ultra pure water flows.

In addition, the number of the bypass pipe lines is not necessarily limited to one.

Since ultra pure water runs inside the bypass pipe line, an austenitic stainless steel or an inorganic glass rather than a plastic or a resin may preferably be used as a material for the bypass pipe line for the above-described reasons.

The apparatus according to the present invention may have a device for blocking the carbon dioxide gas when abnormality occurs, the device comprising: a resistivity sensor for monitoring the conductivity of the resistivity-controlled ultra pure water produced; a resistivity-meter which operates in response to the resistivity sensor; and a solenoid valve which can block the supply of the carbon dioxide gas in response to a signal from the resistivity sensor. Here, "when abnormality occurs" refers to the situation where abnormality is assumed to occur somewhere in the apparatus when the resistivity of the resistivity-controlled ultra pure water is out of the desired range. Accordingly, when the resistivity declines sharply, the device for blocking the gas operates.

The present invention will be described in further detail.

As described above, methods have been hitherto proposed in which carbon dioxide gas is added to ultra pure water at a predetermined concentration using hollow-fiber membranes in order to control the resistivity of ultra pure water, as disclosed in Japanese Patent Application, Second Publication (Kokoku) No. Hei 5-21841. Accordingly, mechanisms for dissolving carbon dioxide gas into ultra pure water and the relation between the concentration of carbon dioxide gas and the resistivity of the ultra pure water when the carbon dioxide gas is directly dissolved in the ultra pure water have been known according to various references.

However, the flow rate of ultra pure water fluctuates sharply, and it is difficult in practice to maintain and control the predetermined resistivity of the ultra pure water following the fluctuation in the flow rate of the ultra pure water.

In view of the above, the present inventors found that the resistivity of ultra pure water can be controlled by dividing untreated ultra pure water into two flows, adding carbon dioxide gas to one of the flows at a concentration higher than the concentration which results in the predetermined resistivity, and diluting the ultra pure water to which the carbon dioxide has been added with the other flow of untreated ultra pure water.

That is to say, an important point of the present invention is to make it possible to easily produce resistivity-controlled ultra pure water by: dividing the flow of untreated ultra pure water, which is supplied at a rate corresponding to the rate of resistivity-controlled ultra pure water used in a subsequent process, into two flows, one of which is larger than the other, with constant proportions by distributing device; supplying the smaller flow to a hollow-fiber membrane module, in which the smaller flow and a flow of carbon dioxide gas are separated by a membrane, so as to produce a carbon-dioxide-added ultra pure water, in which the ultra pure water contains carbon dioxide at a high carbon dioxide concentration; combining the carbon-dioxide-added ultra pure water with the larger flow of the untreated ultra pure water; and uniformly mixing the combined water. The step of dividing the untreated ultra pure water may be performed in several ways, for example, by using piping in the apparatus or by providing a bypass pipe line in the hollow-fiber membrane module.

It is preferable that the water containing carbon dioxide be a so-called carbon-dioxide-saturated water, in which no more carbon dioxide can dissolve at the predetermined water temperature, and which is under the critical pressure above which bubbles are formed in the water. Under such conditions, the flow of the water containing carbon dioxide is more robust against disordered conditions outside the apparatus such as fluctuation in the flow rate, and thus the resistivity can be easily controlled.

The proportions of the flow rates of the divided untreated ultra pure water flows, to one of which carbon dioxide is to be added and the other is to be untreated, largely vary depending on the desired resistivity value. Furthermore, the preferable controlled range of the resistivity value largely varies depending on the type of semiconductor or liquid crystal devices for which the resistivity-controlled ultra pure water is used, or on the cleaning step in which the resistivity-controlled ultra pure water is used.

For the purpose of general use, a resistivity of 0.05 $M\Omega \cdot cm$ or higher is desirable. In the case where untreated ultra pure water is divided into two flows, from one of which a carbon-dioxide-saturated water is produced, and where the carbon-dioxide-saturated water and the other flow are combined in order to control the resistivity as in the present invention, the resistivity of 0.05 $M\Omega \cdot cm$ is obtained when the dividing proportion of the flow for the carbon-dioxide-saturated water to the other flow of untreated ultra pure water is 1/1.

In the step of cleaning wafers in production of semiconductor or liquid crystal devices in recent years, a resistivity of 0.1 $M\Omega \cdot cm$ or higher has been particularly desired. In this case, the proportion of flow for the carbon-dioxide-saturated water (the smaller flow) to the other flow of untreated ultra pure water (the larger flow) may be less than 1/50.

EXAMPLES

The present invention will be more specifically described by examples and a comparative example. However, the present invention is not limited to these examples.

In these examples, the resistivity of the ultra pure water was measured using commercially available resistivity measuring instruments ("200CR" manufactured by Thornton Associates, Inc., and "CE-480R" manufactured by COS Co., Ltd.).

Ultra pure water having a resistivity of 18.2 $M\Omega \cdot cm$ at 25° C. was used as the untreated ultra pure water. The flow rate of the ultra pure water was made to fluctuate in a range between 2 and 8 liters/minute. The fluctuation was made to occur in such a manner that the flow rate was maintained for 30 seconds, and then was shifted to another flow rate. The supply pressure of the ultra pure water was 2 $kgf/cm^2 \cdot G$.

A carbon dioxide gas cylinder of 7 $m^3$ was used as a source for carbon dioxide gas. The pressure of the carbon dioxide gas to be injected into the membrane module was adjusted to 1 $kgf/cm^2 \cdot G$ using a two-stage pressure regulator and a pressure regulating valve.

Example 1

A hollow-fiber membrane module 1 of an internal water-flow type for supplying carbon dioxide gas into ultra pure water having a membrane area of 0.5 $m^2$ ("SEPAREL PF-001", a product of Dainippon Ink and Chemicals, Inc.) was obtained by making a bundle of hollow-fiber membranes of poly-4-methylpentene-1 having an inner diameter of 200 $\mu m$ and an outer diameter of 250 $\mu m$, and fastening the bundle to the inside of a housing, which was made of a clean vinyl chloride resin, at the both ends of the bundle of hollow-fiber membranes using a resin. The permeation flux of carbon dioxide gas of the hollow-fiber membranes was 3.5×10$^{-5}$ $cm^3/cm^2 \cdot sec \cdot cmHg$. The gas separation factor (the permeation flux of oxygen)/(the permeation flux of nitrogen) of the hollow-fiber membranes was 1.2. The permeation flux of carbon dioxide gas and the gas separation factor were common to the following examples and the comparative example.

FIG. 1 is a schematic view showing an apparatus of Example 1, into which the hollow-fiber membrane module 1 is incorporated.

In the apparatus of Example 1, the hollow-fiber membrane module 1 is provided midway of a line 2 for adding carbon dioxide gas to ultra pure water. Upstream of the hollow-fiber membrane module 1, an end of a bypass pipe line 3 is connected to the line 2 for adding carbon dioxide gas via a distributing device 5. The other end of the bypass pipe line 3 is connected to the line 2 downstream of the hollow-fiber membrane module 1 via a combining device 6. Upstream of the distributing device 5, an inlet 7 for untreated ultra pure water is provided. Downstream of the combining device 6, an outlet 8 for the ultra pure water which has undergone the treatment for adding carbon dioxide gas is provided. The line 2 for adding carbon dioxide gas, which is between the hollow-fiber membrane module 1 and the distributing device 5, and the bypass pipe line 3 is provided with flowmeters F11 and F12, respectively. At a central portion of the hollow-fiber membrane module 1, an opening 9 for injecting carbon dioxide gas is provided, to which a carbon dioxide gas line 4 is connected. A pressure regulating valve 10 is provided midway of the carbon dioxide gas line 4. A pressure gauge PI is provided between the opening 9 for injecting carbon dioxide gas and the pressure regulating valve 10 on the carbon dioxide gas line 4.

The apparatus of Example 1 works as follows.

Untreated ultra pure water is introduced into the apparatus through the inlet 7 for untreated ultra pure water. The untreated ultra pure water is divided into a flow of a relatively small flow rate and a flow of a relatively large flow rate by the distributing device 5. The flow of relatively small flow rate is led to the line 2 for adding carbon dioxide gas, and is further led to the inside of the hollow-fiber membranes in the hollow-fiber membrane module 1. The flow of relatively large flow rate is led to the bypass line 3. Carbon dioxide gas is introduced into the carbon dioxide gas line 4. The pressure of this carbon dioxide gas is regulated to a constant value by the pressure regulating valve 10 and thereafter the carbon dioxide gas is led from the opening 9 for injecting carbon dioxide gas to the inside of the hollow-fiber membrane module 1 so as to be brought into contact with the outer surface of the hollow-fiber membranes. Then, the carbon dioxide gas penetrates through the hollow-fiber membranes, and is added to the untreated ultra pure water in the hollow fiber membranes. Here, the untreated ultra pure water in the hollow-fiber membranes becomes water with a high concentration of carbon dioxide (or water saturated with carbon dioxide). This water with a high concentration of carbon dioxide is led to the outlet side of the hollow-fiber membrane module 1, and is combined with the flow of relatively large flow rate from the bypass pipe line 3 by the combining device 6. Thus, the desired resistivity-controlled ultra pure water is obtained.

The resistivity of the resistivity-controlled ultra pure water produced using the apparatus of FIG. 1 was measured while the total flow rate of the ultra pure water was made to fluctuate. The results for the change in resistivity with this apparatus are shown in Table 1. Almost no delay in the response to fluctuations in the flow rate was observed.

Example 2

Figure 2:
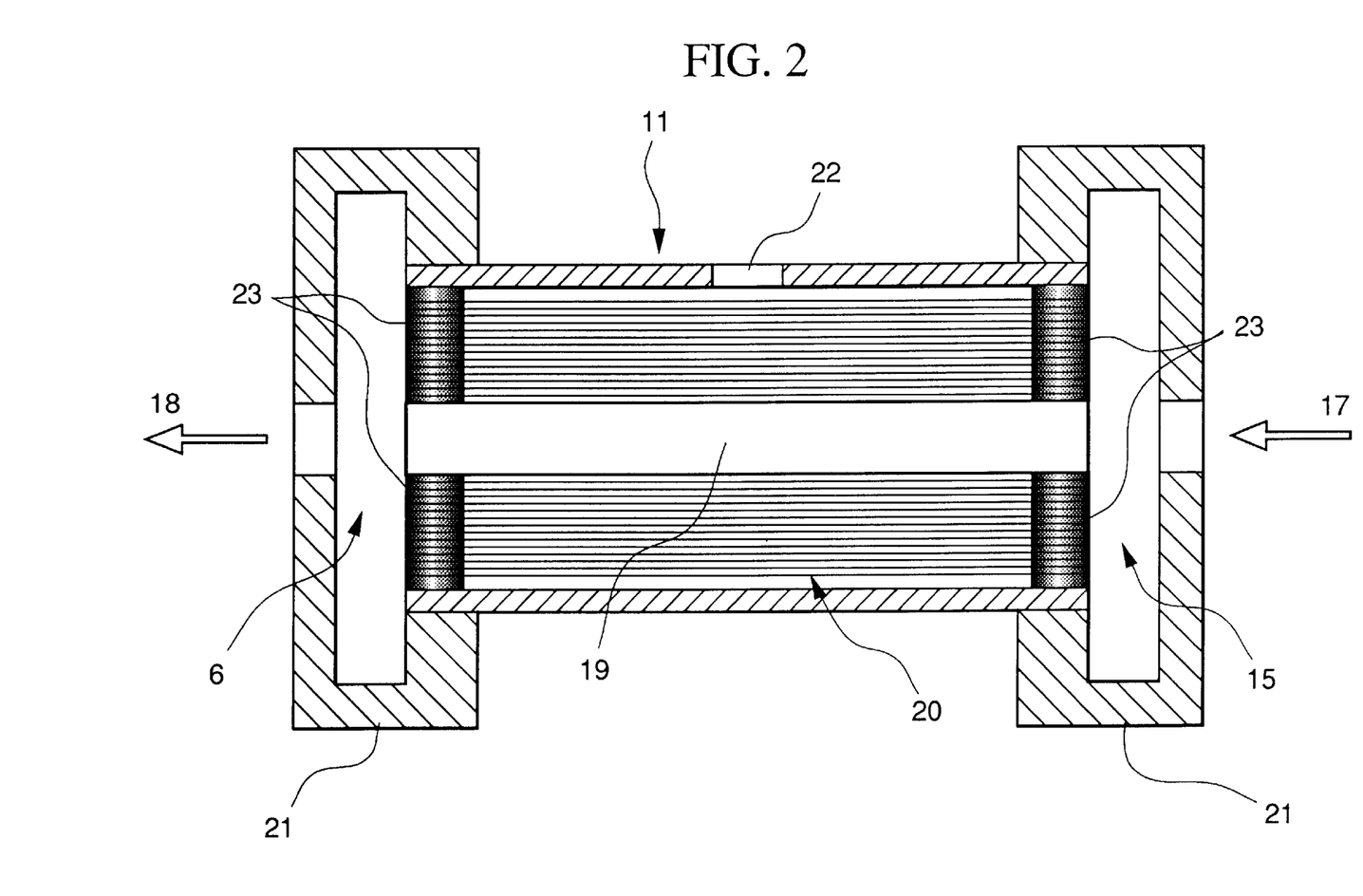
FIG. 2 is a longitudinal sectional view of a hollow-fiber membrane module of an internal water-flow type according to Example 2 of the present invention, in which a bypass pipe line 19 bundled together with hollow-fiber membrane portion 20 is placed.

In Example 2, a hollow-fiber membrane module 11 of an internal water-flow type which is provided with a bypass pipe line ("SEPAREL PF-001R5", a product of Dainippon Ink and Chemicals, Inc.) was used. FIG. 2 shows a longitudinal sectional view of the hollow-fiber membrane module 11.

This hollow-fiber membrane module 11 is a module of an internal-flow type in which a tube which serves as the bypass pipe line 19 and a hollow-fiber membrane portion 20 are housed in a housing which is made of a clean vinyl chloride resin. The hollow-fiber membrane portion 20 is a bundle of hollow-fiber membranes of poly-4-methylpentene-1 having an inner diameter of 200 $\mu$m and an outer diameter of 250 $\mu$m. The hollow-fiber membrane portion 20 has a membrane area of 0.5 $m^2$. Each end of the hollow-fiber membrane portion 20 is fastened by resin to form a bonding-sealing portion 23 through which the hollow-fiber membranes and the housing are bonded and sealing is provided. The bypass pipe line 19 is a tube made of SUS316 for use with ultra pure water. In the apparatus of Example 2, the proportion of the untreated ultra pure water supplied to the bypass pipe line 19 with respect to that supplied to the hollow-fiber membrane 20 is 50:1. An opening 22 for injecting carbon dioxide gas is provided in the middle of the housing of the hollow-fiber membrane module 11.

At each end of the housing of the hollow-fiber membrane module 11, the openings of the membranes in the hollow-fiber membrane portion 20 and the opening of the bypass pipe line 19 are disposed on the same plane. Both ends of the housing are covered by end caps 21. Accordingly, a distributing portion 15 for ultra pure water and a combining portion 16 are formed at inner sides of the end caps 21. An inlet 17 for untreated ultra pure water is formed through the end cap 21 which forms the distributing portion 15. An outlet 18 for ultra pure water which has undergone the treatment of adding carbon dioxide gas is formed through the other end cap 21 which forms the combining portion 16. Accordingly, the hollow-fiber membrane module 11 of this example is an integration of all parts such as a distributing device, a hollow-fiber membrane module, a bypass pipe line, and a combining device. The aforementioned proportions of untreated ultra pure water supplied to the hollow-fiber membrane portion 20 and that supplied to the bypass pipe line 19 reflect the proportions of the total area of the opening of the hollow-fiber membrane portion 20 and the total area of the opening of the bypass pipe line 19 to the side of the distributing portion 15.

The apparatus of Example 2 works as follows.

Untreated ultra pure water is introduced into the distributing portion 15 in the apparatus through the inlet 17 for untreated ultra pure water. The untreated ultra pure water is introduced into the insides of the hollow-fiber membranes in the hollow-fiber membrane module 20 and into the inside of the bypass pipe line 19 in a proportion of 1:50. Carbon dioxide gas is introduced into the hollow-fiber membrane module 1 via the opening 22 for injecting carbon dioxide gas, and is brought into contact with the outer surface of the hollow-fiber membranes. Then, the carbon dioxide gas penetrates through the hollow-fiber membranes, and is added to the untreated ultra pure water in the hollow fiber membranes. Here, the untreated ultra pure water in the hollow-fiber membranes becomes water with a high concentration of carbon dioxide (or water saturated with carbon dioxide). This water with a high concentration of carbon dioxide is led to the combining portion 16, where it is combined with the untreated ultra pure water from the bypass pipe line 19. The thus-obtained desired resistivity-controlled ultra pure water is withdrawn from the outlet 18.

The resistivity of the resistivity-controlled ultra pure water produced using the apparatus of FIG. 2 was measured while the total flow rate of the ultra pure water was made to fluctuate. The results for the change in resistivity with this apparatus are shown in Table 1. Almost no delay in the response to the fluctuation of the flow rate was observed.

Example 3

The hollow-fiber membrane module used in Example 3 is a module of an internal water-flow type ("SEPAREL PF-001R15", a product of Dainippon Ink and Chemicals, Inc.), which has a structure similar to that of the hollow-fiber membrane module of Example 2 except that the proportion of the untreated ultra pure water supplied to the bypass pipe line with respect to that supplied to the hollow-fiber membrane is 150:1.

The resistivity of the resistivity-controlled ultra pure water produced using this apparatus was measured while the total flow rate of the ultra pure water was made to fluctuate. The results for the change in resistivity with this apparatus are shown in Table 1. Almost no delay in the response to the fluctuation of the flow rate was observed.

Example 4

The hollow-fiber membrane module used in Example 4 was the same as that of Example 1, but the flow path for the carbon dioxide gas and the flow path for the ultra pure water are switched in the hollow-fiber membrane module. That is, carbon dioxide gas was made to flow inside the hollow-fiber membranes, and ultra pure water was made to flow outside the hollow-fiber membranes.

The resistivity of the resistivity-controlled ultra pure water produced using the apparatus of Example 4 was measured while the total flow rate of the ultra pure water was made to fluctuate. The results for the change in resistivity with this apparatus are shown in Table 1. Almost no delay in the response to the fluctuation of the flow rate was observed.

Comparative Example

An apparatus of Example 1 from which the bypass pipe line was removed was used in the Comparative Example. The initial carbon dioxide gas pressure was so regulated that the resistivity value was set at 0.1 MΩ·cm when untreated ultra pure water ran at 2 liters/minute. The gas pressure under these conditions was 1.2 kgf/cm$^2$·G. Subsequently, the resistivity of the resistivity-controlled ultra pure water produced was measured while the total flow rate of the ultra pure water was made to fluctuate between 2 and 8 liters/minute, maintaining the carbon dioxide gas pressure. The results for the change in resistivity at this time are shown in Table 1.

Next, the carbon dioxide gas pressure was so regulated that the resistivity value was set at 0.2 MΩ·cm when untreated ultra pure water ran at 2 liters/minute. The gas pressure under these conditions was 0.1 kgf/cm$^2$·G. Subsequently, the resistivity of the resistivity-controlled ultra pure water produced was measured while the total flow rate of the ultra pure water was made to fluctuate between 2 and 8 liters/minute, maintaining the other conditions. The results for the change in resistivity at this time are also shown in Table 1.

In the Comparative Example, marked delay in the response to the fluctuation of the flow rate was observed for both preset resistivity values.

TABLE 1

CHANGE IN RESISTIVITY IN EXAMPLES

|  | Dilution (*1) | Total flow rate of ultra pure water (L/min.) | | | |
| --- | --- | --- | --- | --- | --- |
|  |  | 2 | 4 | 6 | 8 |
| Example 1 | 1/50 | 0.10 | 0.10 | 0.10 | 0.11 |
|  | 1/150 | 0.20 | 0.20 | 0.20 | 0.20 |
| Example 2 | 1/50 | 0.10 | 0.11 | 0.10 | 0.11 |
| Example 3 | 1/50 | 0.19 | 0.19 | 0.19 | 0.20 |
| Example 4 | 1/50 | 0.10 | 0.12 | 0.14 | 0.09 |
|  | 1/150 | 0.18 | 0.23 | 0.25 | 0.23 |
| Comparative | (*2) | 0.10 | 0.12 | 0.18 | 0.33 |
| Example | (*3) | 0.20 | 0.23 | 0.32 | 0.41 |

Unit of Resistivity: MΩ·cm (*1): Dilution ratio = $\dfrac{\text{Proportion of water flow from module}}{\text{Proportion of water flow from bypass pipeline}}$ (*2): Resistivity was preset at 0.1 MΩ·cm when the flow rate of the untreated ultra pure water was 2 L/min.
(*3): Resistivity was preset at 0.2 MΩ·cm when the flow rate of the untreated ultra pure water was 2 L/min.

What is claimed is:

1. An apparatus for adding carbon dioxide gas to ultra pure water comprising:

a housing to house a gas permeable membrane, the gas permeable membrane dividing the interior of the housing into an ultra pure water path and a carbon dioxide gas path, the housing having an opening for injecting carbon dioxide gas through which the carbon dioxide gas path communicates with the exterior of the housing, an inlet in fluid communication with a source of a fluctuating flow of untreated ultra pure water which communicates with the ultra pure water path, a distributing portion provided between the ultra pure water path and the inlet for untreated ultra pure water, an outlet for resistivity-controlled ultra pure water which communicates with the ultra pure water path, a combining portion which is provided between the ultra pure water path and the outlet for resistivity-controlled ultra pure water, and a bypass line through which the distributing portion communicates with a combining portion, wherein a fluctuating flow of untreated ultra pure water introduced from the inlet for untreated ultra pure water is divided into a flow for the ultra pure water path and a flow for the bypass line at constant flow rate proportions, and the gas permeable membrane supplies carbon dioxide gas to the untreated ultra pure water which passes through the ultra pure water path up to the saturation concentration or up to an approximately constant concentration near the saturation concentration at any flow rate in an expected fluctuation range.

2. An apparatus for adding carbon dioxide to ultra pure water, wherein the resistivity of the ultra pure water is controlled to have a desired value by bringing the carbon dioxide gas into contact with the ultra pure water via a gas permeable membrane so as to supply the carbon dioxide gas to the ultra pure water, the apparatus comprising:

an inlet in fluid communication with a source of a fluctuating flow of untreated ultra pure water, means for adding carbon dioxide gas to the ultra pure water, the means comprising a membrane module having a gas permeable membrane, the membrane module supplying the carbon dioxide gas to the ultra pure water up to the saturation concentration or up to an approximately constant concentration near the saturation concentration at any flow rate in an expected fluctuation range, whereby the ultra pure water to which the carbon dioxide gas is added has a constant resistivity at any flow rate of the ultra pure water supplied, and means for combining the ultra pure water to which the carbon dioxide gas has been added and untreated ultra pure water, to which carbon dioxide gas has not been added, and for uniformly mixing them, whereby the ultra pure water to which the carbon dioxide gas has been added is diluted with the untreated ultra pure water so as to produce, after mixing, resistivity-controlled ultra pure water, which has the predetermined resistivity.

3. An apparatus according to claim 2,
wherein the gas permeable membrane
a hollow-fiber membrane for producing, at a relatively small flow rate, ultra pure water to which carbon dioxide gas is added,
said apparatus further comprising:
a bypass pipe line for running untreated ultra pure water,
a distributing device for dividing the untreated ultra pure water into a flow for the hollow-fiber membrane module and a flow for the bypass pipe line with constant proportions of the flow rates,
a combining-mixing device for combining the ultra pure water to which carbon dioxide gas has been added and the untreated ultra pure water which has passed the bypass pipe line, and for uniformly mixing them, and
a pressure regulating valve for maintaining a constant pressure of the carbon dioxide gas which is supplied to the hollow-fiber membrane module.

4. An apparatus according to claim 3, wherein the bypass pipe line is provided inside the hollow-fiber membrane module.

5. An apparatus according to claim 3, wherein the hollow-fiber membrane module is of an internal water-flow type comprising a housing and a bundle of a plurality of hollow fiber membranes housed in the housing, in which carbon dioxide gas is injected into a space between the exterior of the hollow-fiber membrane and the housing, and in which the ultra pure water flows inside the hollow fiber membranes.

6. An apparatus according to claim 3, wherein the hollow-fiber membrane module is of an external water-flow type comprising a housing and a bundle of a plurality of hollow fiber membranes housed in the housing, in which carbon dioxide gas is injected inside the hollow fiber membranes, and in which the ultra pure water flows in a space between the exterior of the hollow-fiber membrane and the housing.

7. An apparatus according to claim 5, wherein the bypass pipe line is provided inside the hollow-fiber membrane module, the bypass pipe line, which is a tube which does not allow carbon dioxide gas to penetrate its wall, and the plurality of hollow-fiber membranes are bundled together and housed in the housing.

8. An apparatus according to claim 3, wherein the hollow fiber membrane is a hydrophobic gas permeable membrane, having a permeation flux of carbon dioxide gas of $100 \times 10^{-5}$ $cm^3/cm^2 \cdot sec \cdot cmHg$ or less, and a gas separation factor higher than 1, the gas separation factor being calculated by dividing the permeation flux of oxygen by the permeable flux of nitrogen.

9. An apparatus according to claim 8, wherein the hollow-fiber membrane comprises poly-4-methylpentene-1, and has an inner diameter of 20 to 350 $\mu$m and an outer diameter of 50 to 1000 $\mu$m.

10. An apparatus according to claim 2, further comprising a static mixer for uniformly mixing the ultra pure water to which the carbon dioxide gas has been added and the untreated ultra pure water, the static mixer being provided downstream of the means for combining the ultra pure water to which the carbon dioxide gas has been added and the untreated ultra pure water.

11. An apparatus according to claim 3, further comprising a device for blocking the carbon dioxide gas when abnormality occurs, the device comprising:
a resistivity sensor for monitoring the conductivity of the resistivity-controlled ultra pure water produced,
a resistivity-meter which operates in response to the resistivity sensor, and
a solenoid valve which can block the supply of the carbon dioxide gas in response to a signal from the resistivity sensor.

12. A process for adding carbon dioxide gas to ultra pure water comprising the steps of:
dividing a fluctuating flow of untreated ultra pure water into two flows with constant proportions,
producing carbon-dioxide-added ultra pure water by adding carbon dioxide gas to one of the flows of the untreated ultra pure water via a gas permeable membrane up to the saturation concentration or up to an approximately constant concentration near the saturation concentration, and
combining the carbon-dioxide-added ultra pure water and the other flow of untreated ultra pure water.

13. A process for adding carbon dioxide gas to ultra pure water to produce a resistivity-controlled ultra pure water at a rate corresponding to a fluctuating rate of ultra pure water used in a subsequent process, the process for adding carbon dioxide to ultra pure water comprising the steps of:
dividing a fluctuating flow of untreated ultra pure water, which is supplied at a rate corresponding to a rate of resistivity-controlled ultra pure water used in the subsequent process, into two flows, one of which is larger than the other, with constant proportions, by a distributing device,
supplying the smaller flow to a hollow-fiber membrane module, in which the smaller flow and the flow of carbon dioxide gas are separated by a hollow-fiber membrane, so as to produce a carbon-dioxide-added ultra pure water, in which ultra pure water contains carbon dioxide at the saturation concentration or at an approximately constant concentration near the saturation concentration at any flow rate in an expected fluctuation range,
combining the carbon-dioxide-added ultra pure water with the larger flow of the untreated ultra pure water, and
uniformly mixing the combined water to produce ultra pure water which has a predetermined controlled resistivity.

14. A process for adding carbon dioxide gas to ultra pure water according to claim 13, wherein the larger flow of untreated ultra pure water is made to flow in a bypass pipe line which is provided inside the hollow-fiber membrane module.

15. A process for adding carbon dioxide gas to ultra pure water according to claim 13, wherein the proportion of the smaller flow to the larger flow is less than 1/50.

16. A process for adding carbon dioxide gas to ultra pure water according to claim 13, wherein the carbon-dioxide-added ultra pure water is ultra pure water saturated with carbon dioxide.

17. A process for adding carbon dioxide gas to ultra pure water according to claim 16, wherein the pressure of the carbon dioxide gas which is in contact with the hollow-fiber membrane is maintained at a constant level using a pressure regulating valve so as to maintain the concentration of the carbon-dioxide-added ultra pure water at the saturation concentration or at an approximately constant concentration near the saturation concentration, and wherein the flow of carbon dioxide gas is supplied at rates varied according to fluctuations in the smaller flow of the untreated ultra pure water.

* * * * *